(12) United States Patent
Van Horck et al.

(10) Patent No.: US 12,519,338 B2
(45) Date of Patent: Jan. 6, 2026

(54) AUXILIARY BATTERY CIRCUIT FOR AN LED DRIVER

(71) Applicant: eldoLAB Holding B.V., Son en Breugel (NL)

(72) Inventors: Franciscus Bernardus Marie Van Horck, Son en Breugel (NL); Marc Saes, Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 42 days.

(21) Appl. No.: 18/015,285

(22) PCT Filed: Jul. 13, 2021

(86) PCT No.: PCT/EP2021/069429
§ 371 (c)(1),
(2) Date: Jan. 9, 2023

(87) PCT Pub. No.: WO2022/013203
PCT Pub. Date: Jan. 20, 2022

(65) Prior Publication Data
US 2023/0261513 A1    Aug. 17, 2023

(30) Foreign Application Priority Data
Jul. 13, 2020    (NL) ..................... 2026052

(51) Int. Cl.
*H02J 9/06*    (2006.01)
*H05B 45/375*    (2020.01)
*H05B 45/38*    (2020.01)

(52) U.S. Cl.
CPC ............ *H02J 9/061* (2013.01); *H05B 45/375* (2020.01); *H05B 45/38* (2020.01)

(58) Field of Classification Search
CPC ....... H02J 9/061; H05B 45/375; H05B 45/38; H05B 45/3725; H05B 45/48
See application file for complete search history.

(56) References Cited

U.S. PATENT DOCUMENTS 5,148,042 A * 9/1992 Nakazoe ................ G06F 1/263
307/66
5,828,207 A * 10/1998 Saadeh ................... H02J 9/061
307/66

(Continued)

FOREIGN PATENT DOCUMENTS

EP         2811617 A1    12/2014
KR    20160033468 A     3/2016

(Continued)

OTHER PUBLICATIONS

International Search Report and Written Opinion for International Application No. PCT/EP2021/069429, dated Oct. 1, 2021, 13 pages.

(Continued)

*Primary Examiner* — Daniel Kessie
*Assistant Examiner* — Brian K Baxter
(74) *Attorney, Agent, or Firm* — Sikand IP Law PLLC

(57)    ABSTRACT

Disclosed is an auxiliary battery circuit for an LED driver for driving at least one LED group. The LED driver is adapted to be powered by a main energy source. The auxiliary battery circuit comprises: a battery, a conversion circuit adapted to be connected to the LED driver and to the battery. The conversion circuit has: a first mode wherein the battery is adapted to receive energy from the LED driver, and a second mode wherein the battery is adapted to provide energy to the LED driver. A control unit of the auxiliary battery circuit is adapted to detect when the main energy source is in a failure mode, and control the conversion circuit. The control unit is adapted to arrange the conversion (Continued)

Figure 1:
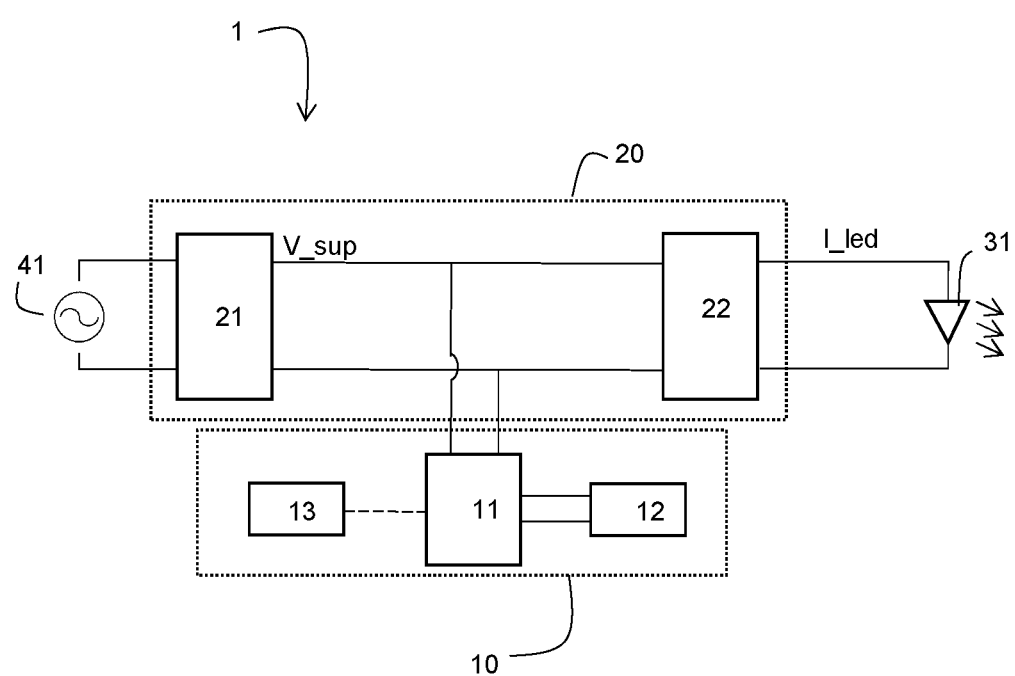

circuit in the second mode when the main energy source is in the failure mode.

16 Claims, 3 Drawing Sheets

(56) References Cited

U.S. PATENT DOCUMENTS

| | | | | |
|---|---|---|---|---|
| 8,192,039 B1* | 6/2012 | Moe | ............... | H02J 9/065 |
| | | | | 362/800 |
| 8,779,695 B2* | 7/2014 | Saes | ............... | H05B 45/48 |
| | | | | 315/297 |
| 9,270,143 B1* | 2/2016 | Mangiaracina | .... | H05B 45/3725 |
| 9,490,663 B1 | 11/2016 | Kim et al. | | |
| 9,634,512 B1* | 4/2017 | Kim | ............... | H02J 7/00 |
| 10,172,196 B2* | 1/2019 | Welten | ............... | H05B 45/46 |
| 10,477,642 B2* | 11/2019 | Pishdadian, Jr. | ....... | H02J 7/007 |
| 10,616,970 B2* | 4/2020 | Johnson | ............... | H05B 47/105 |
| 11,399,422 B2* | 7/2022 | Deschenes | ........... | H05B 45/345 |
| 2003/0231009 A1* | 12/2003 | Nemoto | ............... | H02J 7/02 |
| | | | | 323/276 |
| 2006/0033442 A1* | 2/2006 | D'Angelo | ............... | H05B 45/44 |
| | | | | 315/86 |
| 2007/0047100 A1* | 3/2007 | Takahashi | ............... | H02J 9/061 |
| | | | | 359/689 |
| 2011/0068713 A1* | 3/2011 | Hoogzaad | ........... | H05B 45/3725 |
| | | | | 315/307 |
| 2012/0104974 A1* | 5/2012 | Saes | ............... | H05B 45/32 |
| | | | | 315/297 |
| 2012/0176064 A1* | 7/2012 | Saes | ............... | H05B 47/175 |
| | | | | 315/307 |
| 2012/0223649 A1* | 9/2012 | Saes | ............... | H05B 45/48 |
| | | | | 315/186 |
| 2012/0229041 A1* | 9/2012 | Saes | ............... | H05B 45/10 |
| | | | | 315/200 R |
| 2013/0026950 A1* | 1/2013 | Saes | ............... | G09G 3/006 |
| | | | | 315/297 |
| 2013/0162165 A1* | 6/2013 | Saes | ............... | H05B 45/38 |
| | | | | 315/224 |
| 2013/0320875 A1* | 12/2013 | Saes | ............... | H05B 45/3725 |
| | | | | 315/224 |
| 2014/0009067 A1* | 1/2014 | Saes | ............... | H05B 47/18 |
| | | | | 315/307 |
| 2014/0333229 A1* | 11/2014 | Saes | ............... | H05B 45/395 |
| | | | | 315/307 |
| 2015/0091451 A1 | 4/2015 | Williams | | |
| 2015/0214785 A1* | 7/2015 | Jagjitpati | ............... | H02J 9/065 |
| | | | | 307/66 |
| 2017/0202063 A1* | 7/2017 | Saes | ............... | H02J 7/02 |
| 2018/0034313 A1* | 2/2018 | Frankland | ........... | H05B 45/3725 |
| 2018/0062425 A1* | 3/2018 | Frankland | ............ | H02J 7/0068 |
| 2018/0177010 A1* | 6/2018 | Liu | ............... | H05B 45/3725 |
| 2018/0323641 A1* | 11/2018 | Lee | ............... | H02J 7/0013 |
| 2019/0110342 A1* | 4/2019 | Saes | ............... | H05B 45/44 |
| 2019/0141802 A1* | 5/2019 | Saes | ............... | H05B 45/3725 |
| 2019/0356159 A1* | 11/2019 | Coccia | ............... | H05K 7/1492 |
| 2020/0015333 A1* | 1/2020 | Ackermann | ....... | H05B 45/3575 |
| 2020/0119369 A1* | 4/2020 | Westphal | ............... | H02J 7/1423 |
| 2020/0163186 A1* | 5/2020 | Poojary | ............... | H02J 7/0068 |
| 2020/0363025 A1* | 11/2020 | Jeswani | ............... | F21V 23/003 |
| 2020/0383185 A1* | 12/2020 | Zijlman | ............... | H05B 45/3725 |
| 2021/0313880 A1* | 10/2021 | Gao | ............... | H02H 7/1213 |
| 2021/0378067 A1* | 12/2021 | Fu | ............... | H05B 45/357 |
| 2022/0191991 A1* | 6/2022 | Padilla Guardado | .. | G01R 31/44 |

FOREIGN PATENT DOCUMENTS

| | | |
|---|---|---|
| KR | 101717283 B1 | 3/2017 |
| WO | 2013186656 A1 | 12/2013 |
| WO | 2015185570 A1 | 12/2015 |
| WO | 2016134396 A2 | 9/2016 |

OTHER PUBLICATIONS

Office Action (Communication pursuant to Article 94(3) (EPC) issued Aug. 14, 2024, by the European Patent Office in corresponding European Patent Application No. 21 745 292.9-1201 (12 pages).

* cited by examiner

AUXILIARY BATTERY CIRCUIT FOR AN LED DRIVER

CROSS-REFERENCE TO RELATED APPLICATIONS

This application is a 371 filing of International Application No. PCT/EP2021/069429, filed Jul. 13, 2021, which claims priority to Netherlands Application No. NL 2026052, filed Jul. 13, 2020. The disclosures of these applications are incorporated herein by reference in their entireties for all purposes.

The present invention relates to the technical field of auxiliary battery circuits, which may in particular be used for or be part of an LED driver.

Over the recent years, light emitting diode (LED) applications have found many applications, mainly because of their advantages over traditional lighting techniques. For example, LED may allow for lower energy usage and the better controllable light, wherein e.g. colour temperature and/or intensity can be manipulated.

In general, a main energy source may be provided for powering the LED(s), e.g. being a mains. For certain lighting applications, it may be required that the LED(s) provide light even or especially when the main energy source fails. In such cases an auxiliary energy source may be provided to power the LED(s) during failure of the main energy source. In known systems, the auxiliary energy source is e.g. connected to the main energy source and the LED(s), thereby being arranged in parallel to an LED driver.

It is an object of the present invention to provide an improved auxiliary battery circuit, in particular being simpler and/or cheaper than known solutions; or at least to provide an alternative for known solutions.

This object is achieved with an auxiliary battery circuit for an LED driver for driving at least one LED group, wherein the LED driver is adapted to be powered by a main energy source having an operational mode and a failure mode, the auxiliary battery circuit comprising:
  a battery connection adapted to be connected to a battery,
  a conversion circuit adapted to be connected to the LED driver and, by means of the battery connection, to the battery, wherein the conversion circuit has:
    i. a first mode wherein the battery is adapted to receive energy from the LED driver, and
    ii. a second mode wherein the battery is adapted to provide energy to the LED driver,
  a control unit adapted to
    i. detect when the main energy source is in a failure mode, and
    ii. control the conversion circuit, wherein the control unit is adapted to arrange the conversion circuit in the second mode when the main energy source is in the failure mode.

The invention thus relates to an auxiliary battery circuit, which can be used for an LED driver. The LED driver is adapted to drive at least one LED group. An LED group may e.g. comprise one or more LED(s), arranged in series and/or parallel to each other. In embodiments wherein the LED driver drives more than one LED group, said LED groups may be arranged in series and/or parallel to each other. The different LEDs and/or LED groups may e.g. be adapted to emit light with the same or different colour temperature and/or intensity. The LED driver is adapted to be powered by a main energy source. The main energy source may e.g. be an AC mains, e.g. at 240V and 50 Hz or at 120V/277V and 60 Hz. The main energy source may e.g. be a main battery, e.g. in a vehicle. The main energy source may e.g. be a generator.

The LED driver may e.g. comprise and AC/DC converter adapted to convert the energy provided by the main energy source or mains energy supply to a DC supply voltage. The AC/DC converter may e.g. comprise a buck/boost converter, a flyback converter, a power factor corrector (PFC) flyback converter, or another PFC-converter such as the combination of a PFC boost converter and an LLC converter. The LED driver may e.g. comprise a driver control unit adapted to control the light emitted by the one or more LED groups, e.g. being able to control colour temperature and/or intensity of the emitted light and/or which LED groups emit light. The driver control unit may e.g. be powered by the AC/DC converter. The driver control unit may e.g. be adapted to control the supply voltage provided by the AC/DC converter, e.g. by controlling one or more switches. The driver control unit may e.g. be adapted to receive a user input signal representing a desired light output, based on which the control unit may be adapted to control the colour temperature, and/or intensity of the light emitted by the at least one LED group. The LED driver may comprise any other features that known LED drivers may comprise.

The auxiliary battery circuit comprises a battery connection, a conversion circuit and a control unit. The battery connection is adapted to be connected to a battery, e.g. using two connections between the conversion circuit and the battery or using one connection between the conversion circuit and the battery and one connection to a ground. Optionally, the auxiliary battery circuit may comprise one or more connection terminals for connecting the battery to the auxiliary battery circuit. In particular, the conversion circuit is adapted to be connected to the battery by means of the battery connection. The battery may be any element that is able to store and release electrical energy. For example, the battery may be a nickel-metal hydride (NiMH) battery, a lead-acid battery, or lithium-ion (Li-ion) battery.

The conversion circuit is further adapted to be connected to the LED driver, e.g. using two connections between the conversion circuit and the LED driver or using one connection between the conversion circuit and the LED driver and one connection to a ground. Optionally, the LED driver or the auxiliary battery circuit may comprise one or more connection terminals for connecting the auxiliary batter circuit to the LED driver. When the conversion circuit is connected to the LED driver and the battery, the battery is electrically connected to the LED driver via the conversion circuit.

The control unit is adapted to detect when the main energy source is in a failure mode. For example, the main energy source may have an operational mode and a failure mode. The operational mode corresponds with a normal functioning of the main energy source, wherein energy is supplied or can be supplied to the at least one LED group by the main energy source. While the main energy source is in the operational mode, the conversion circuit is preferably in a first mode. In said first mode during use of the auxiliary battery circuit, the battery is adapted to receive energy from the LED driver, which the LED driver in turn may receive from the main energy source. The battery is as such being charged or maintained at full capacity.

The failure mode of the main energy source corresponds with the main energy source providing reduced or no energy, e.g. below a predetermined threshold which is required for properly powering the at least one LED group. When the main energy source is a mains, this may e.g. occur when there is a failure in energy network to which the mains is connected. When the main energy source is a main battery, this may e.g. occur when the battery has (almost) provided all its energy. The control unit may e.g. be electrically connected at an input terminal to the main energy source or to the supply voltage provided by the LED driver to the at least one LED group. The control unit may then be adapted to determine that the main energy source is in a failure mode when the voltage, current, or power at said input terminal is below a predetermined threshold. The control unit of the auxiliary battery circuit may e.g. be connected to a driver control unit of the LED driver which is electrically connected at an input terminal to the main energy source or to the supply voltage provided by the LED driver to the at least one LED group. The control unit or the driver control unit is adapted to determine that the main energy source is in a failure mode when the voltage, current, or power at said input terminal is below a predetermined threshold.

In the failure mode the main energy source may not be able to provide sufficient energy for the at least one LED group to emit sufficient light. The control unit is therefore adapted to control the conversion circuit. The conversion circuit may e.g. comprise one or more switches which the control unit is adapted to control. When the failure mode is detected, the control unit is adapted to arrange the conversion circuit in a second mode. In the second mode during use of the auxiliary battery circuit, the battery is adapted to provide energy to the LED driver. The at least one LED group can be powered via the LED driver with the energy provided by the battery.

The invention thus ensures that the at least one LED group can emit light even when the main energy source is in the failure mode. By connecting the auxiliary battery circuit to the LED driver, it can be avoided that separate components such as AC/DC converters are required for converting the energy provided by the main energy source to charge the battery. The invention provides a relatively simple and cheap solution. In addition, the LED driver may be embodied in accordance with any known embodiments and features, since its functionality can in embodiments be independent of the auxiliary battery circuit.

In embodiments, the auxiliary battery circuit further comprises the battery, wherein the battery is connected to the battery connection.

In embodiments, the conversion circuit is adapted in the first mode to arrange the battery and the at least one LED group to be powered by the main energy source in parallel, and to arrange the at least one LED group to be powered by the battery in the second mode. The conversion circuit may e.g. comprise one or more switches which the control unit is adapted to control. In the first mode, the battery can be charged by the main energy source while the main energy source is powering the at least one LED group. In the second mode, the battery can power the at least one LED group.

In embodiments, the control unit is further adapted to detect when the main energy source is in an operational mode and arrange the conversion circuit in the first mode when the main energy source is in the operational mode. When the main energy source is no longer in the failure mode, the control unit ensures that the conversion circuit is switched back to the first mode, and the battery is recharged. Advantageously, no additional intervention, e.g. manual, is required for the auxiliary battery circuit to keep functioning as desired. The control unit may be adapted to detect that the main energy source is in the operational mode in similar ways to how the control unit is adapted to detect that the main energy source is in the failure mode.

In embodiments, the conversion circuit comprises a buck/boost converter, wherein the conversion circuit is adapted to arrange the buck/boost converter in a buck inductor mode in the first mode and to be in a boost inductor mode in the second mode. For example, the battery may be arranged at a voltage that is lower than the voltage in the LED driver where the conversions circuit is adapted to be connected to the LED driver. Advantageously, both functionalities of the buck/boost converter can be used. In addition, a buck inductor mode and a boost inductor mode can be used with relatively little components, keeping the auxiliary battery circuit relatively simple and cheap. The conversion circuit may e.g. comprise one or more switches controlled by the control unit to switch between the buck inductor mode and the boost inductor mode.

In embodiments, the control unit is adapted to be powered by the battery at least when the main energy source is in the failure mode. In embodiments, the battery is adapted the power the control unit at least when the main energy source is in the failure mode. Advantageously, it can be ensured that the control unit is still able to function when the main energy source is not able to provide sufficient energy. For example, the control unit may comprise an input terminal which is electrically connected to the battery.

In embodiments, the control unit is adapted to be connected to or integrated with a driver control unit of the LED driver. Optionally the battery is further arranged to power the driver control unit when the main energy source is in the failure mode. Optionally the driver control unit is further adapted to be powered by the battery when the main energy source is in the failure mode. The LED driver may e.g. comprise a driver control unit for controlling the light emitted by the at least one LED group, e.g. being adapted to control which LED groups are emitting light and/or being adapted to control the colour temperature and/or intensity of the emitted light. The control unit of the auxiliary battery circuit may be connected to the driver control unit of the LED driver. The control unit of the auxiliary battery circuit can then e.g. be adapted to send a failure mode signal to the driver control unit of the LED driver, such that the driver control unit of the LED driver can control the at least one LED group in accordance with an emergency setting. The driver control unit of the LED driver may e.g. be electrically connected to the main energy source, and be adapted to provide a signal to the control unit of the auxiliary battery circuit representative of the voltage, current, or power supplied by the main energy source, such that the control unit of the auxiliary battery circuit can detect the failure mode. The driver control unit of the LED driver may e.g. be adapted to detect the failure mode of the main energy source and provide a failure mode signal to the control unit of the auxiliary battery circuit. When the main energy source is in the failure mode, the battery may be adapted to supply energy to the driver control unit, such that the driver control unit can still function. For example, an input terminal of the driver control unit may be electrically connected to the battery. For example, the battery may be electrically connected to the control unit, and the control unit may be electrically connected to the driver control unit and adapted to power the driver unit when the main energy source is in the failure mode. In embodiments, the driver control unit of the LED driver and the control unit of the auxiliary battery circuit may be integrated in a single control unit.

The control unit of the auxiliary battery circuit and/or the driver control unit of the LED driver may be embodied as any suitable control unit, e.g. comprising one or more of a microprocessor, an integrated circuit (IC), a programmable logic processor (PLC), a microprogrammable control unit, a hardwired control unit. The control unit of the auxiliary battery circuit and/or the driver control unit of the LED driver may e.g. comprise a memory for storing on or more of: a predetermined threshold, instructions, when and/or for how long the main energy source is in the failure mode.

In embodiments, the conversion circuit comprises at least one switch, wherein the control unit is adapted to control the at least one switch for arranging the conversion circuit in the first mode and/or the second mode. By controlling the switch, the control unit can control the conversion circuit. The switch may be any kind of suitable switch, e.g. a MOSFET such as a Si MOSFET, a GaN MOSFET, or a Sic MOSFET, or a bipolar transistor. The control unit can e.g. be adapted to control the switch by providing a voltage or current to the switch, e.g. wherein a voltage or current above a predetermined threshold results in the switch being on or off. In embodiments the conversion circuit comprises a first switch and a second switch. For example, the conversion circuit may in the first mode when the first switch is a controlled state and the second switch in an open state, and in the second mode when the second switch is a controlled state and the first switch in an open state. In the controlled state the first and second switch are in a conducting state for at least a part of the time. In some embodiments, the first and/or second switch may remain in the conducting state when being in the controlled state. In other embodiments, the first and/or second switch may be altered between an open state and a conducting state when being in the controlled state, e.g. being switched at a switching frequency.

In embodiments, the control unit is adapted to determine that the main energy source is in a failure mode and arrange the conversion circuit in the second mode within a predetermined switching time after failure of the main energy source. The predetermined switching time may e.g. be determined in correspondence with safety requirements and/or safety standards, e.g. the UL924 standard. The predetermined switching time may e.g. be 200 ms, 150 ms, or 100 ms.

In embodiments, the battery is adapted to provide energy to the LED groups for at least a predetermined hold-up time when the conversion circuit is in the second mode. The predetermined hold-up time may e.g. be determined in correspondence with safety requirements and/or safety standards, e.g. the UL924 standard. The predetermined hold-up time may e.g. be 60 minutes, 90 minutes, or 120 minutes.

In embodiments, the battery is adapted to provide at most 60V and 100 VA. In embodiments, the battery is adapted to comply with class 2 standards in accordance with UL1310. By limiting the voltage and power that the battery provides, the voltage and power in the rest of the auxiliary battery circuit are also limited, at least at a battery-side of the conversion circuit. Besides being advantageous for safety as such, this also allows to implement the components in accordance with less stringent safety and insulation requirements, being advantageous for cost.

The invention further relates to an LED driver circuit for driving at least one LED group. The LED driver circuit is adapted to be powered by a main energy source and comprises an LED driver. The LED driver comprises at least one pair of connection terminals for connecting the at least one LED group The LED driver circuit further comprises an auxiliary battery circuit according to the invention, wherein the conversion circuit of the auxiliary battery circuit is connected to the LED driver. The auxiliary battery circuit and the LED driver may be embodied in accordance with any of the embodiments described herein, and/or may comprise any of the features described herein.

In embodiments, the LED driver circuit may comprises the battery, wherein the battery is connected to the battery connection.

In embodiments, the LED driver circuit comprises a driver control unit adapted to control the light emitted by the at least one LED group, e.g. being adapted to control which LED groups are emitting light and/or being adapted to control the colour temperature and/or intensity of the emitted light. In embodiments, the driver control unit and the control unit of the auxiliary battery circuit are integrated in a single control unit.

In embodiments, the control unit or the driver control unit is adapted to control the voltage and/or the current supplied to the at least one LED group in accordance with an emergency setting when the main energy source is in the failure mode. For example, the emergency setting may entail that the at least one LED group emits light at a lower intensity, e.g. to ensure that the battery is able to power the at least one LED group for a sufficient time. For example, the emergency setting may determine the colour temperature of the emitted light. It may e.g. be desirable to emit white cold light to ensure that people are alert during an emergency situation in which the main energy source failed.

The invention further relates to a method that achieves one or more of the objects of the present invention. The method may be performed using the auxiliary battery circuit according to the invention, but is not limited thereto. Nevertheless, any of the features explained herein with respect to the auxiliary battery circuit of the invention may be analogously applied to the method according to the invention, and vice versa. Features and definitions explained with respect to the auxiliary battery circuit the invention will be interpreted in the same way with respect to the method according to the invention, unless explicitly mentioned otherwise.

The invention relates to a method for controlling an auxiliary battery circuit for an LED driver for driving at least one LED group, wherein the auxiliary battery circuit comprises a conversion circuit and a battery, wherein the conversion circuit is connected to the LED driver and the battery,
  wherein the method comprises the following steps:
  powering the LED driver and the at least one LED group with a main energy source operating in an operational mode while the conversion circuit of the auxiliary battery circuit is in a first mode, wherein in the first mode the battery is adapted to receive energy from the LED driver,
  detecting when the main energy source is in a failure mode,
  when the main energy source is in the failure mode:
    arranging the conversion circuit of the auxiliary battery circuit in a second mode, wherein in the second mode a battery of the auxiliary battery circuit is adapted to provide energy to the LED driver.

In an embodiment the method further comprises a step of detecting when the main energy source is in the operational mode, and a step of, when the main energy source in the operational mode: arranging the conversion circuit in the first mode.

In an embodiment arranging the conversion circuit in the second mode includes arranging at least one LED group to be powered by the battery. In an embodiment arranging the conversion circuit in the first mode includes arranging the battery and the at least one LED group to be powered in parallel by the main energy source.

In an embodiment the conversion circuit comprises a buck/boost converter, wherein the conversion circuit being in the first mode includes using the buck/boost converter in a buck inductor mode, and the conversion circuit being in the second mode includes using the buck/boost converter in a boost inductor mode.

In an embodiment the method comprises a step of powering a control unit and/or a driver control unit with the battery when the main energy source is in the failure mode.

In an embodiment arranging the conversion circuit in the first mode and/or in the second mode includes controlling at least one switch.

In an embodiment the detecting that the main energy source is in a failure mode and the arranging of the conversion circuit in the second mode is performed within a predetermined switching time, e.g. 150 ms, after failure of the main energy source.

In an embodiment the method further comprises a step of supplying voltage and/or current to the at least one LED group in accordance with an emergency setting when the main energy source is in the failure mode.

Although the invention is explained herein with reference to powering an LED group, it will be appreciated that this is an example and the invention is not limited thereto. The auxiliary battery circuit and method according to the invention can equally be applied for other applications that require an auxiliary battery circuit for powering a load when a main energy source fails, e.g. control circuits for safety equipment in industrial processes. Alternative definitions for the auxiliary battery circuit and the method in an embodiment are given below. It will be understood that any of the features or embodiments explained above may be added to the definitions given below.

For example, the auxiliary battery circuit according to the invention may also be described as an auxiliary battery circuit for a power converter, e.g. a DC/DC converter, for powering a load, e.g. an electric load, wherein the power converter is adapted to be powered by a main energy source, the auxiliary battery circuit comprising:
  a battery connection adapted to be connected to a battery,
  a conversion circuit adapted to be connected to the power converter and to the battery by means of the battery connection, wherein the conversion circuit has:
    i. a first mode wherein the battery is adapted to receive energy from the power converter, and
    ii. a second mode wherein the battery is adapted to provide energy to the power converter,
  a control unit adapted to
    i. detect when the main energy source is in a failure mode, and
    ii. control the conversion circuit, wherein the control unit is adapted to arrange the conversion circuit in the second mode when the main energy source is in the failure mode.

For example, the method according to the invention may also be described as a method for controlling an auxiliary battery circuit for a power converter, e.g. a DC/DC converter, for powering a load, e.g. an electric load, wherein the auxiliary battery circuit comprises a conversion circuit and a battery, wherein the conversion circuit is connected to the power converter and the battery,
  wherein the method comprises the following steps:
    powering the power converter and the load with a main energy source while the conversion circuit of the auxiliary battery circuit is in a first mode, wherein in the first mode the battery is adapted to receive energy from the power converter,
    detecting when the main energy source is in a failure mode,
    when the main energy source is in the failure mode:
      arranging the conversion circuit of the auxiliary battery circuit in a second mode, wherein in the second mode a battery of the auxiliary battery circuit is adapted to provide energy to the power converter.

Figure 2:
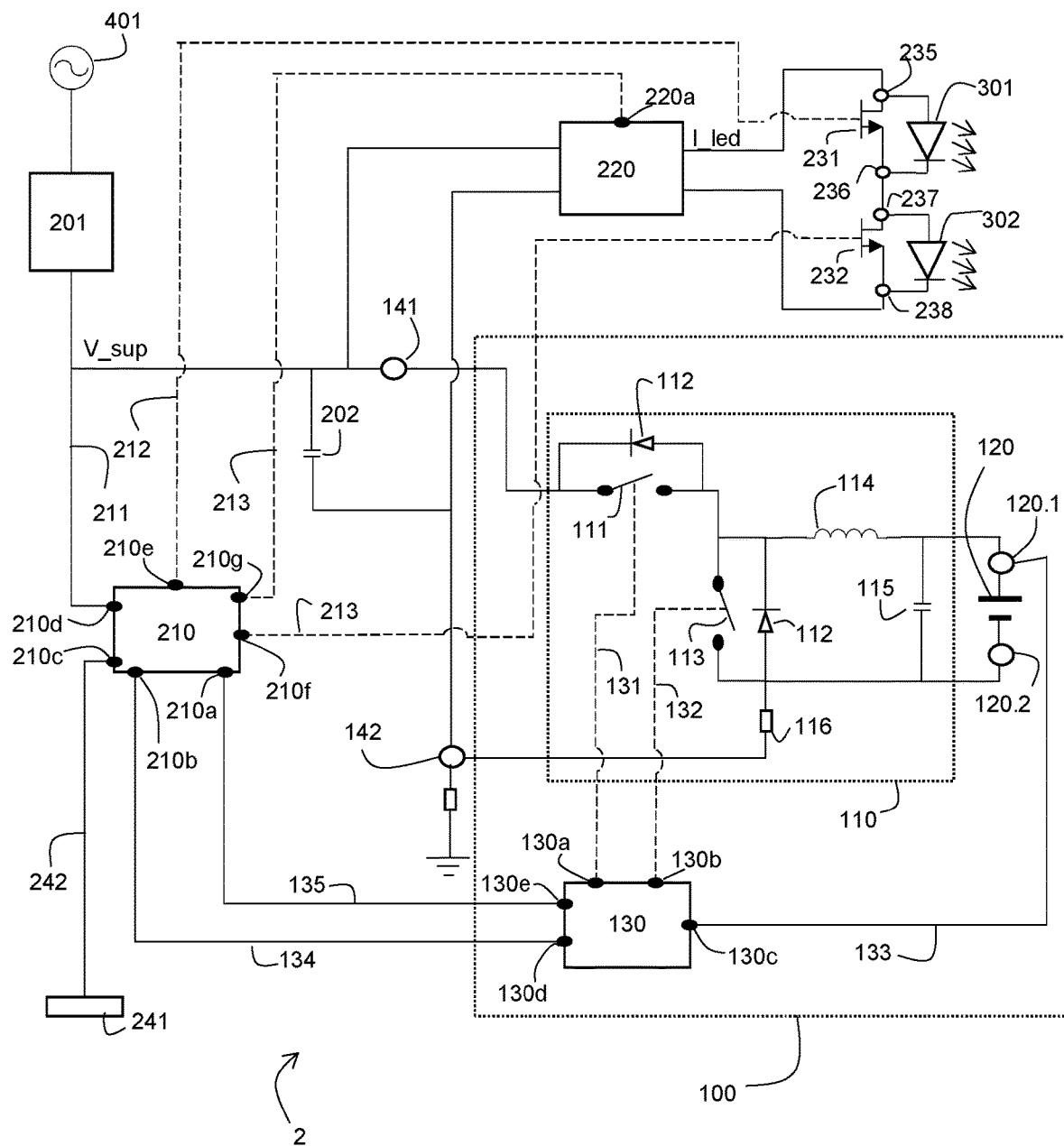
Figure 3:
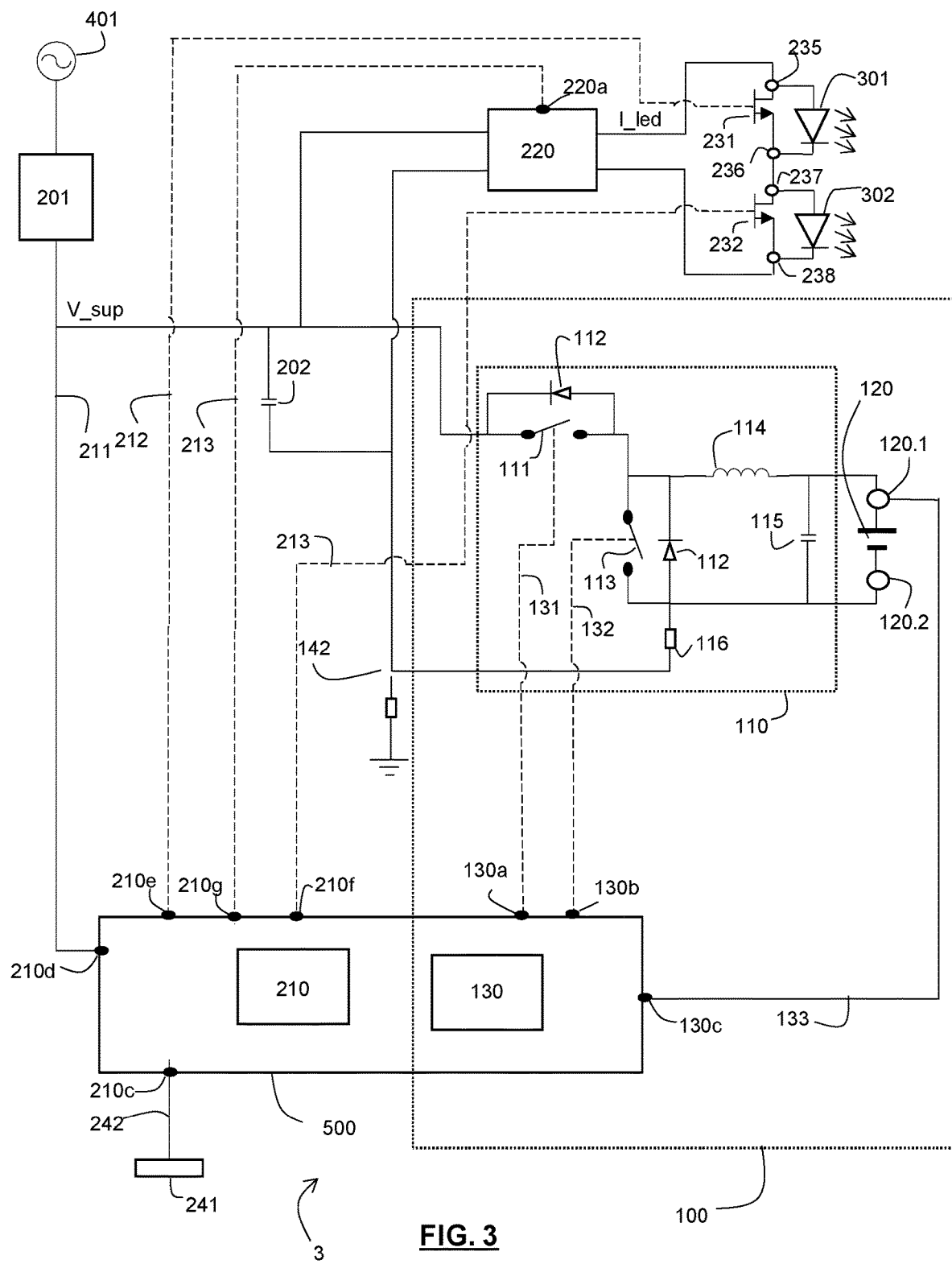

The invention will be described below with reference to the figures. These figures serve as examples to illustrate the invention, and will not be construed as limiting the scope of the claims. In the different figures, like features are indicated by the like reference numerals. In the figures:

FIG. 1: schematically illustrates a first embodiment of the invention;

FIG. 2: schematically illustrates a second embodiment of the invention;

FIG. 3: schematically illustrates a third embodiment of the invention.

FIG. 1 schematically illustrates a first embodiment of the invention. The invention relates to an auxiliary battery circuit 10 for an LED driver 20. The LED driver 20 drives at least one LED group 31. The LED driver 20 and the auxiliary battery circuit 10 are comprised by an LED driver circuit 1. The LED driver circuit 1 and the LED group 31 may optionally be comprised by an LED fixture.

In FIG. 1, a single LED is depicted for schematically illustrating the at least one LED group 31. It will be appreciated that in practice the at least one LED group 31 may comprise any suitable number of LED groups 31 arranged in series or parallel, and each LED group 31 may comprise any suitable number of LEDs arranged in series or parallel.

The LED driver 20 is powered by a main energy source 41, which in this case is a mains, e.g. supplying 240V or 120V/277V at 50 Hz or 60 Hz. The LED driver 20 comprises an AC/DC converter module 21, which supplies a steady supply voltage V_sup. The AC/DC converter module 21 may comprise any known components, such as a front end driver, a PFC flyback converter, or a buck/boost converter. The LED driver 20 further comprises power converter 22 which is adapted to convert the supply voltage V_sup into an LED current I_led for the LED group 31. The power converter 22 may e.g. comprise a DC/DC converter, and/or a switched mode power converter (SMPS), and/or a Buck or Boost converter.

The arrangement of the main energy source 41, the LED driver 20 and the LED group 31 may be according to known LED drivers. When the main energy source 41 is in an operational mode, the LED group 31 is powered by the main energy source. In practice, however, it may happen that the main energy source 41 cannot provide sufficient energy for the LED group 31, which corresponds with the main energy source 41 being in a failure mode. It may be desired that even when the main energy source 41 is in the failure mode, the LED group 31 is able to emit light. For example, in a stairway of a building it may be required that there still is sufficient light in such situations, such that people can safely leave the building. Furthermore, although the invention herein is explained with reference to powering an LED group 31, it will be understood that the invention may equally be applied for other application. For example, the invention may be applied for a safety circuit, wherein it is required that energy is supplied to a load 31 during failure mode of the main energy source 41. It is also possible to apply the invention for lighting applications which use lighting sources other than LEDs.

To provide energy to the LED group 31 during the failure mode of the main energy source 41, the invention provides an auxiliary battery circuit 10. The auxiliary battery circuit 10 comprises a conversion circuit 11 and a control unit 13. In the shown embodiment the auxiliary battery circuit 10 also comprises the battery 12, but it will be appreciated that it is also possible that the auxiliary battery circuit 10 is connected to a battery 12. The conversion circuit 11 is connected to both the LED driver 20 and the battery 12. While the main energy source 41 is in the operational mode, the conversion circuit 11 is in a first mode. In said first mode, the battery 12 is adapted to receive energy from the LED driver 20. For example, the battery 12 may be arranged in parallel with the LED group 31 in the first mode. As such, the battery 12 is charged and/or kept at full charge with energy provided from the main energy source 41. When the main energy source 41 is in the failure mode, this is detected by the control unit 13. For example, the control unit 13 may be able to detect that the supply voltage V_sup drops, since the auxiliary battery circuit 10 is electrically connected to the supply voltage V_sup. When the main energy source 41 is in the failure mode, the control unit 13 arranges the conversion circuit 11 in a second mode. In the second mode the battery 12 is adapted to provide energy to the LED driver 20. As such, the LED group 31 can be powered with the battery 12.

The invention thus provide an auxiliary energy source with the battery 12, which is able to power the LED group 31 when the main energy source 41 is in a failure mode. By connecting the conversion circuit 11 to the LED driver 20, it is avoided that a separate circuit such as the AC/DC converter module 21 is required for providing energy of the main energy source 41 to the battery 12.

In practice, the reason why the main energy source 41 was in the failure mode may be resolved, meaning that the main energy source 41 provides sufficient energy to power the LED group again, and thus returns to the operational mode. The control unit 13 may also be able to detect that the main energy source 41 is back in the operational mode, and arrange the conversion circuit 11 back into the first mode. This allows to use the auxiliary battery circuit 10 for a plurality of times without additional measures such as human or manual actions. While the conversion circuit 11 is back in the first mode, the battery 12 is being charged by the main energy source 41.

FIG. 2 schematically shows a second embodiment of the invention. A first LED group 301 and a second LED group 302 in an LED fixture are arranged in series. The first LED group 301 is connected to a first pair of LED connection terminals 235, 236 of an LED driver, and the second LED group 302 is connected to a second pair of LED connection terminals 236, 237. The LED driver is part of an LED driver circuit 2, which further comprises an auxiliary battery circuit 100.

A main energy source 401, which is a mains, is provided for powering the LED groups 301, 302. The LED driver comprises an AC/DC converter module 201 which converts the energy supplied by the main energy source 401 into a stable supply voltage V_sup. The AC/DC converter 201 may e.g. comprise a rectifier, e.g. a full-bridge or half-bridge rectifier, a power factor correction (PFC) circuit, and/or a flyback converter.

The LED driver comprises a power converter 220 which is adapted to convert the supply voltage V_sup into an LED current I_led for the LED groups 301, 302. The intensity of the light emitted by the LED groups 301 may be determined by the led current lied. The COMPONENT 220 may e.g. comprise a buck converter. The power converter 220 may e.g. comprise a DC/DC converter, and/or a switched mode power converter (SMPS), and/or a Buck or Boost converter.

The LED driver further comprises a driver control unit 210. The driver control unit 210 is able to control a first LED switch 231 with a first LED switch control signal 212 via output terminal 210e, and to control a second LED switch 232 with a first LED switch control signal 213 via output terminal 210f. The first LED switch 231 is arranged in parallel with the first LED group 301 and the second LED switch 232 is arranged in parallel with the second LED group 302. By controlling the first LED switch 231 and the second LED switch 232, the driver control unit 210 is adapted to control whether the led current I_led flows through the first LED group 301 and the second LED group 302, respectively, and as such whether light is emitted by the first LED group 301 and the second LED group 302, respectively. The control unit 210 can as such control the light emitted by the LED groups 301, 302. For example, the first LED group 301 and the second LED group 302 can be adapted to emit light of a different colour temperature, and the control unit 210 can control the colour temperature of the light emitted by the LED groups 301, 302 together. In the shown example the first LED switch 231 and the second LED switch 232 are MOSFET's, but other types of switches can be used.

The driver control unit 210 further comprises an input terminal 210c for receiving a dimming signal 242. The user input signal 242 is generated by a user input interface 241, with which a user can indicate his preference of the light emitted by the LED groups 301, 302. The control unit 210 can be adapted to control the colour temperature and/or intensity of the light emitted by the LED groups 301, 302. For example, the user input interface 241 may be a light dimming knob which the user can manually operate. For example, the user interface 241 may be controllable by means of a mobile application on a mobile device of a user. The user input signal 242 may e.g. be in accordance with Digital Addressable Lighting Interface (DALI). The driver control unit 210 further comprises an output terminal 210g for sending a control signal 213 to an input terminal 220a of the power converter 220. The power converter 220 may be adapted to control the led current I_led based on the control signal 213.

When the main energy source 401 is in an operational mode, the LED groups 301, 302 are powered by the energy provided by the main energy source 401. An auxiliary battery circuit 100 is provided to power the LED groups 301, 302 when the main energy source 401 is in a failure mode. The auxiliary battery circuit 100 is connected to the LED driver via a first driver connection terminal 141 and a second driver connection terminal 142. The first driver connection terminal 141 is, when the main energy source 401 is in the operational mode, at the supply voltage V_sup. The second driver connection terminal 142 is connected to a ground. It will be appreciated that instead of via the second driver connection terminal 142, the auxiliary battery circuit 100 can also be directly connected to the ground.

The auxiliary battery circuit 100 comprises a conversion circuit 110, a battery connection 120.1, 120.2, and a control unit 130. A battery 120 is connected to the battery connection 120.1, 120.2, which in this embodiment comprises two connection terminals 120.1 120.2. The battery 120 may optionally be part of the auxiliary battery circuit 100. The control unit 130 is adapted to detect when the main energy source 401 is in the failure mode. In the shown embodiment, the control unit 130 is adapted to receive a failure signal 134 from the driver control unit 210 via output terminal 210b and input terminal 130d. The driver control unit 210 receives an energy signal 211 at an input terminal 210d. The energy signal 211 is connected to the supply voltage V_sup and can be used for powering the driver control unit 210 when the main energy source 401 is in the operational mode. When the main energy source 401 is in the failure mode, the driver control unit 210 can detect that the energy signal 211 drops, and transmit the failure signal 134 to the control unit 130. It is also possible that the control unit 130 receives an energy signal which is e.g. connected to the supply voltage V_sup in the conversion circuit 110 or between the conversion circuit 110 and the first driver connection terminal 141, wherein the control unit 130 is adapted to detect the failure mode of the main energy source 401 based on said energy signal. In such cases the control unit 130 may also be adapted to transmit a failure signal to the driver control unit 210. It is also possible that the driver control unit 210 or the control unit 130 is connected to an AC/DC signal from the main energy source 401 for detecting the failure more of the main energy source 401, wherein optionally a transformer provides said AC/DC signal. The control unit 130 may comprise a battery management system, e.g. for controlling the battery 120 to avoid that the battery 120 is used outside a predetermined operating area, for monitoring its state, etc.

The conversion circuit 110 comprises a buck/boost converter illustrated in FIG. 2 by a capacitance 115 and an inductor 114. In practice, additional components may be provided. The conversion circuit 110 further comprises a first switch 111 in parallel with a first diode 112, and a second switch 113 in parallel with a second diode 112. The control unit 130 is adapted to control the first switch 111 with a first control signal 131 via output terminal 130a, and to control the second switch 113 with a second control signal 132 via output terminal 130b. The first switch 112 and the second switch 113 may be any kind of suitable switch, e.g. a MOSFET such as a Si MOSFET, a GaN MOSFET, or a Sic MOSFET, or a bipolar transistor.

Initially, the main energy source 401 is in the operational mode, and the conversion circuit 110 is in a first mode. In the first mode, the first switch 111 is in a controlled state and the second switch 113 is in an open state 113. The battery 120 is arranged in parallel with the LED groups 301, 302, and the buck/boost converter is arranged in buck inductor mode. The battery 120 is being charged by the main energy source 401, and/or being kept at maximal charge.

When the control unit 130 detects that the main energy source 401 is in the failure mode, the control unit 130 is adapted to arrange the conversion circuit 110 in a second mode by arranging the first switch 111 in an open state and the second switch 113 in a controlled state. The buck/boost converter is arranged in a boost inductor mode and the battery 120 is arranged to power the LED groups 301, 302. The LED groups 301, 302 are being powered by the battery 120.

In the controlled state the first switch 111 and second switch 113 are in a conducting state for at least a part of the time. The first switch 111 and/or second switch 113 may be altered between an open state and a conducting state when being in the controlled state, e.g. being switched at a switching frequency.

In order to comply with safety standards for lighting applications, the control unit 130 is adapted to detect the failure mode and arrange the conversion circuit 110 in the second mode within a predetermined switching time, e.g. 150 ms, after failure of the main energy source. In case the auxiliary battery circuit 100 according to the invention is used for other applications, the control unit 130 may be adapted to detect the failure mode and arrange the conversion circuit 110 in the second mode in accordance with safety standards for the respective application and/or geographical region.

The control unit 130 is further adapted to detect when the main energy source 401 is back to an operational mode, e.g. the driver control unit 210 may transmit an energy signal 134 or stop transmitting the failure signal 134. The control unit 130 is adapted to arrange the conversion circuit 110 back into the first mode, by arranging the first switch 111 in the controlled state and the second switch 113 in an open state. The battery 120 is now being recharged, and thus able to power the LED groups 301, 302 when the main energy source 401 has another failure mode.

FIG. 2 further illustrates that the battery 120, e.g. the terminal 120.1 of the battery, is connected to an input terminal 130c of the control unit 130 for supplying an energy signal 133. Since the control unit 130 is powered by the battery 120, the control unit 130 is able to control the first switch 111 and the second switch 113 when the main energy source 401 is in the failure mode.

The control unit 130 is further adapted to provide an energy signal 135 to the driver control unit 210 via output terminal 130e and input terminal 210a, when the main energy source 401 is in the failure mode. As such, the driver control unit 210 is able to keep functioning because it is powered by the energy signal 135 with energy that the control unit 130 receives from the battery 120. It is also possible to connect the battery 120 directly to the driver control unit 210 or via a switch that is controlled by the control unit 130 to be in a controlled state when the main energy source 401 is in the failure mode.

The battery 120 is adapted to provide energy for at least 90 minutes to the LED groups 301, 302, in correspondence with safety standards. The battery 120 may e.g. be a nickel-metal hydride battery. The battery 120 is further adapted to provide at most 60V and 100 VA, thereby complying with class é. This allows to design components, e.g. on the battery-side of the buck/boost converter, of the auxiliary battery circuit 100 in accordance with less stringent safety requirements, e.g. less stringent insulation. For example, the battery 120 may be adapted to supply 12V or 18V. Since the supply voltage V_sup may e.g. be at 30V or 60V, the buck/boost converter of the conversion circuit 110 converts the voltage accordingly.

In the embodiment as shown in FIG. 2, the auxiliary battery circuit 100 and the LED driver can optionally be manufactured and/or sold as separate components. For example, they may be provided on separate building blocks such as circuit boards. The auxiliary battery circuit 100 is connected to the LED driver at the first driver connection terminal 141, optionally at the second driver connection terminal 142, and the driver control unit 210 and the control unit 130 may e.g. be connected by means of the failure signal 134 and the energy signal 135. The battery 120 may be part of the auxiliary battery circuit 100, e.g. being integrated with the auxiliary battery circuit 100, or may also be manufactured and/or sold as a separate component, and thereafter be connected to the battery connection 120.1, 120.2.

FIG. 3 schematically illustrates a third embodiment of the invention. FIG. 3 shows an LED driver circuit 3 in which the control unit 130 of the auxiliary battery circuit 100 and the driver control unit 210 are integrated in a single control unit 500. It can further be seen that no explicit driver connection terminals are provided for connecting the LED driver and the auxiliary battery circuit (such as first and second driver connection terminal 141, 142 in FIG. 2). The auxiliary battery circuit 100 and the LED driver may be manufactured and/or sold as integrated components. Optionally, the LED groups 301, 302 and the LED driver circuit 3 may be combined in an LED fixture, e.g. for being sold together. The battery 120 may be integrated and/or sold with the auxiliary battery circuit 100 and the LED driver, or may also be manufactured and/or sold as a separate component, and thereafter be connected to the battery connection 120.1, 120.2.

Furthermore, since the driver control unit 210 and the control unit 130 are integrated, there is no need for failure signal and energy signal between the driver control unit 210 and the control unit 130. When the control unit 500 detects that the main energy source 401 is in the failure mode, e.g. when the voltage of energy signal 211 at input terminal 210*d* drops, the battery 120 powers the control unit 500 by means of energy signal 133 at input terminal 130*c*.

When main energy source 401 is in the failure mode, the control unit 500 is adapted to control the LED groups 301, 302 in accordance with an emergency setting. The dimming signal 242 may be overruled, and/or a user input signal corresponding with the LED groups 301, 302 being off may be overruled. The emergency setting can further e.g. relate to a colour temperature and/or intensity of the light emitted by the LED groups 301, 302. For example, it may be preferred that the emitted light is cold white light, since this may help people being alert during an emergency situation wherein the main energy source fails. The emergency setting can also relate to the energy consumed by the LED groups 301, 302. For example, to ensure that the battery 120 is able to power the LED groups 301, 302 for a sufficient amount of time, one of the LED groups 301, 302 can be turned off during the emergency setting. The control unit 500 may control the voltage and/or current supplied to the LED groups 301, 302. This can be done in several ways. For example, the control unit 500 can control the first LED switch 231 and/or the second LED switch 232 to turn the first LED group 301 and/or the second LED group on or off. For example, the control unit 500 can control the second switch 113 between the open state and the controlled state to limit the power supplied to the LED groups 301, 302. For example, the control unit 500 can control the power converter 220 to control the led current I_led as supplied to the LED groups 301, 302.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfil the functions of several items recited in the description and claims, e.g. of control units. Any communication between features can be wired or wireless according to known methods.

The method according to the invention may be implemented as a program, computer program or software application, or the like. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. An auxiliary battery circuit for an LED driver for driving at least one LED group, wherein the LED driver is adapted to be powered by a main energy source having an operational mode and a failure mode, the auxiliary battery circuit comprising:
   a battery,
   a battery connection adapted to be connected to the battery,
   a conversion circuit adapted to be connected to the LED driver and, via the battery connection, to the battery, wherein the conversion circuit:
      includes a buck/boost converter comprising a capacitor and an inductor, a first switch in parallel with a first diode, and a second switch in parallel with a second diode;
      is configured to operate in a first mode when the main energy source is in the operational mode in which the first switch is in a controlled state to conduct at least part of a time to arrange the battery in parallel with the at least one LED group and the second switch is in an open state, and a second mode when the main energy source is in the failure mode in which the first switch is in the open state and the second switch is in the controlled state; in the first mode, the conversion circuit is configured to provide energy received from the LED driver to the battery; and
      in the second mode, the conversion circuit is configured to provide energy from the battery to the LED driver, thereby enabling the LED driver to drive the at least one LED group,
   a control unit adapted to:
      detect when the main energy source is in a failure mode, and control the conversion circuit, wherein the control unit is adapted to arrange the conversion circuit in the second mode when the main energy source is in the failure mode.

2. The auxiliary battery circuit according to claim 1, wherein when the conversion circuit is connected to both the LED driver and the battery, the conversion circuit is adapted in the first mode to arrange the battery and the at least one LED group to be powered by the main energy source in parallel, and in the second mode to arrange the at least one LED group to be powered by the battery.

3. The auxiliary battery circuit according to claim 1, wherein the control unit is further adapted to detect when the main energy source is in the operational mode and arrange the conversion circuit in the first mode when the main energy source is in the operational mode.

4. The auxiliary battery circuit according to claim 1, wherein the conversion circuit is adapted to arrange the buck/boost converter to be in a buck inductor mode in the first mode and to be in a boost inductor mode in the second mode.

5. The auxiliary battery circuit according to claim 1, wherein the control unit is adapted to be powered by the battery at least when the main energy source is in the failure mode.

6. The auxiliary battery circuit according to claim 1, wherein the control unit is adapted to be connected to or integrated with a driver control unit of the LED driver, wherein optionally the driver control unit is further adapted to be powered by the battery when the main energy source is in the failure mode.

7. The auxiliary battery circuit according to claim 1, wherein the conversion circuit comprises at least one switch, wherein the control unit is adapted to control the at least one switch for arranging the conversion circuit in the first mode or the second mode.

8. The auxiliary battery circuit according to claim 1, wherein the control unit is adapted to detect that the main energy source is in the failure mode and arrange the conversion circuit in the second mode within a predetermined switching time, after failure of the main energy source.

9. The auxiliary battery circuit according to claim 1, wherein the battery is adapted to provide energy to at least one LED group for at least 90 minutes when the conversion circuit is in the second mode.

10. The auxiliary battery circuit according to claim 1, wherein the battery is adapted to provide at most 60V and 100VA.

11. The auxiliary battery circuit according to claim 1, wherein the control unit is adapted to control the first switch with a first control signal via a first output terminal and to control the second switch with a second control signal via a second output terminal.

12. An LED driver circuit for driving at least one LED group, wherein the LED driver circuit:
is adapted to be powered by a main energy source, comprises an LED driver, wherein the LED driver comprises at least one pair of connection terminals for connecting to the at least one LED group, and
comprises an auxiliary battery circuit according to claim 1, wherein the conversion circuit of the auxiliary battery circuit is connected to the LED driver.

13. The LED driver circuit according to claim 12, wherein the control unit is adapted to control the voltage and/or the current supplied from the LED driver to the at least one LED group in accordance with an emergency setting when the main energy source is in the failure mode.

14. An LED fixture comprising at least one LED group and an LED driver circuit according to claim 12 for driving the at least one LED group.

15. A method for controlling an auxiliary battery circuit for an LED driver for driving at least one LED group, wherein the auxiliary battery circuit comprises a conversion circuit and a battery, wherein the conversion circuit is connected to the LED driver and the battery and includes a buck/boost converter comprising a capacitor and an inductor, a first switch in parallel with a first diode, and a second switch in parallel with a second diode,
wherein the method comprises the following steps:
detecting when a main energy source coupled to the LED driver is in an operational mode or a failure mode;
when the main energy source is in the operational mode in which the first switch is in a controlled state to conduct at least part of a time to arrange the battery in parallel with the at least one LED group and the second switch is in an open state, providing energy from the LED driver to the battery with the conversion circuit;
when the main energy source is in the failure mode in which the first switch is in the open state and the second switch is in the controlled state, providing energy from the battery to the LED driver with the conversion circuit, thereby enabling the LED driver to drive the at least one LED group.

16. The method according to claim 15, further comprising the following steps:
detecting when the main energy source is in the operational mode, and when the main energy source in the operational mode: arranging the conversion circuit in the first mode.

\* \* \* \* \*